N. BURR.
Millstone Dress.
No. 94,072. Patented Aug. 24, 1869.
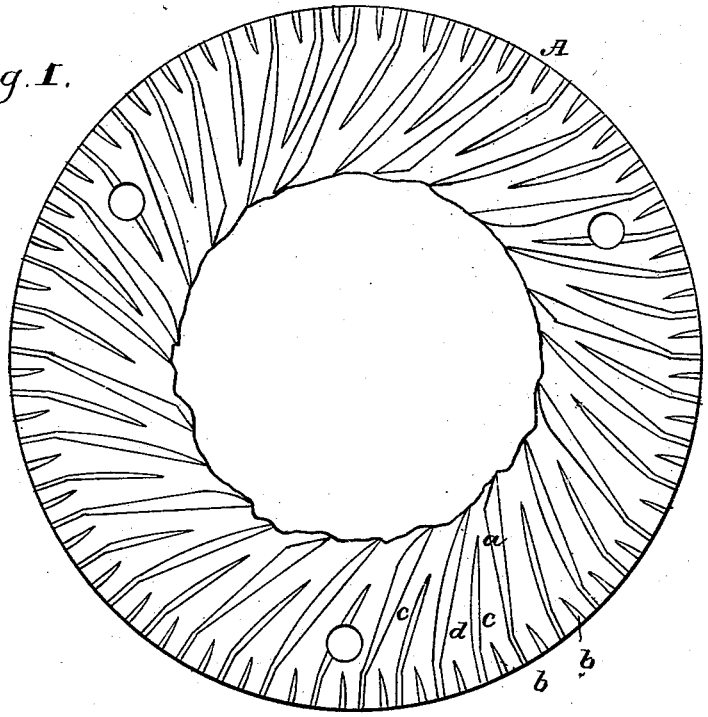
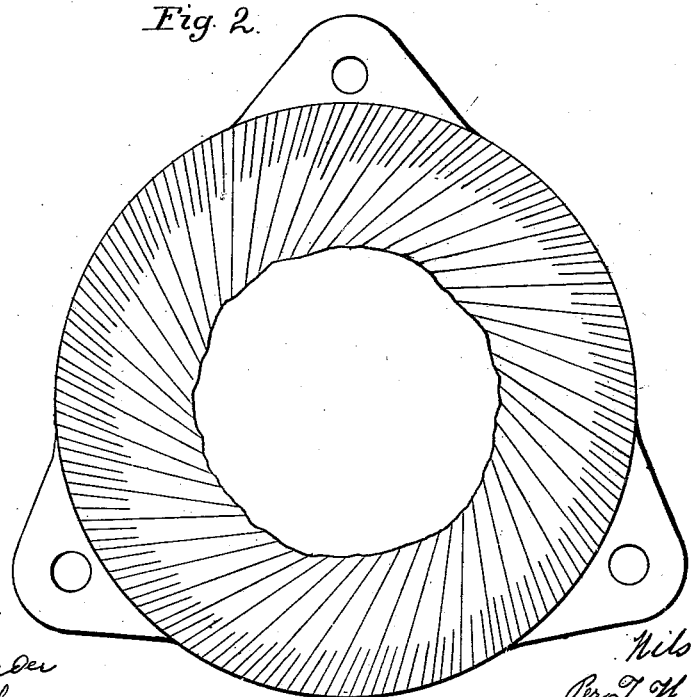

United States Patent Office.

NELSON BURR, OF BATAVIA, ILLINOIS.

Letters Patent No. 94,072; dated August 24, 1869.

IMPROVEMENT IN GRINDING-MILLS.

The Schedule referred to in these Letters Patent and making part of the same.

To all whom it may concern:

Be it known that I, NELSON BURR, of Batavia, in the county of Kane, and State of Illinois, have invented certain new and useful Improvements in Mills; and I do hereby declare that the following is a full, clear, and exact description thereof, reference being had to the accompanying drawings, and to the letters of reference marked thereon, which form a part of this specification, in which—

Figure 1 represents the grinding-surface of the ring or disk.

Figure 2 designates the same form of grinding-surface with fig. 1, but on a reduced scale.

Figure 3 is a central vertical section of the ring or disk.

The nature of my invention consists in the peculiar construction and dressing of cast-iron rings or disks, so as to adapt them for grinding corn or other grain, as set forth.

A represents a cast-iron disk or ring, an inch, more or less, in width on its face, and curved downward from the outer to the inner circumference.

This curved surface is furnished with five distinct series of grinding ridges.

The first series, marked $a$, is plane on the grinding side, slightly convex on the opposite side, and nearly horizontal at its upper edge.

The second series consists of ridges $b$, which extend from the periphery of A inward a quarter of an inch, more or less.

The third series $c$, extends from the periphery of the disk to more than half of its width.

The fourth series $d$, extends from the outer to the inner circumference of the disk A.

The fifth series, marked $e$, has the same length and prominency with $a$, but is slightly curved at its upper edge.

It will be remarked that the upper and lower disks are exact counterparts or duplicates, and when arranged in position for grinding, their respective ridges, as above described, will cross each other at an angle similar to that observed in the dressing of ordinary millstones.

It will be seen that the space between the upper and lower disks at the eye, will be sufficiently wide to receive all the corn that the disks have the capacity to grind, and the grinding-capacity is greatly increased by the rapidity with which the corn is reduced to meal, and the speed with which it is discharged into the meal-chest.

As the grinding-process is carried on near the centre of motion, there is a great gain in power, and an increased rapidity of motion obtained. As a necessary consequence of rapid motion, the centrifugal force will be so great as to expel the meal instantly from between the disks, and thus prevent its heating or clogging.

Experience having proved that a thousand revolutions per minute impart no appreciable warmth to the meal, I claim to have established a principle contrary to that generally received, and to have proved satisfactorily that the mode to increase the capacity of a mill for grinding corn is not to increase the grinding-surface, but to diminish it, as is exhibited by rings or disks.

Having thus described my invention,

What I claim, and desire to secure by Letters Patent, is—

The combination of the two similar grinding-disks, here shown, each provided with the long ridges $a$ and $d$, and the intervening shorter ridges $b$ and $c$, all constructed and arranged as herein set forth.

In testimony that I claim the foregoing as my own, I affix my signature, in presence of two witnesses.

NELSON BURR.

Witnesses:
CHAS. C. STEPHENS,
H. M. ARMSTRONG.